(No Model.) 2 Sheets—Sheet 1.
T. H. HABERKORN.
COMBINATION VALVE FOR OPERATING AIR BRAKE MECHANISM.
No. 398,830. Patented Mar. 5, 1889.
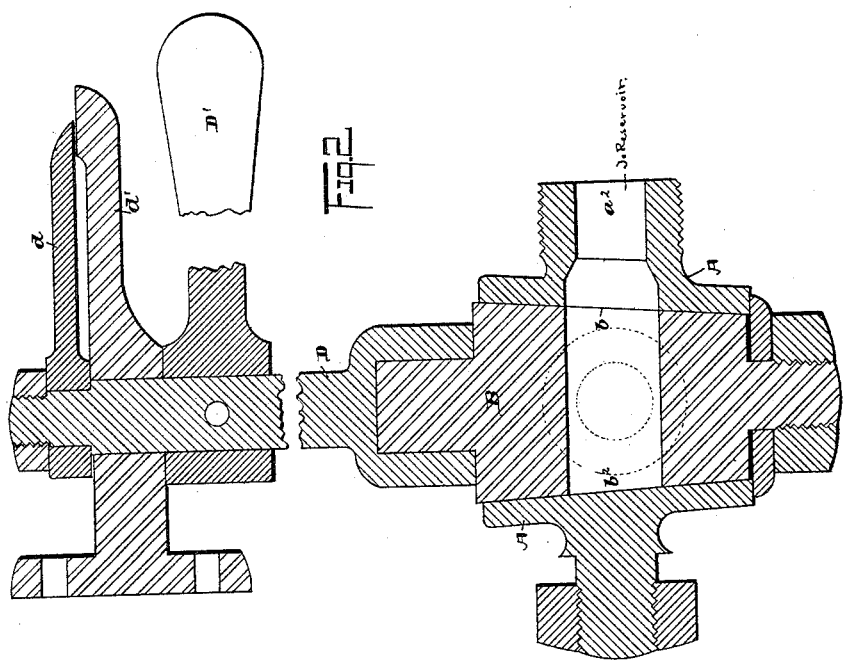
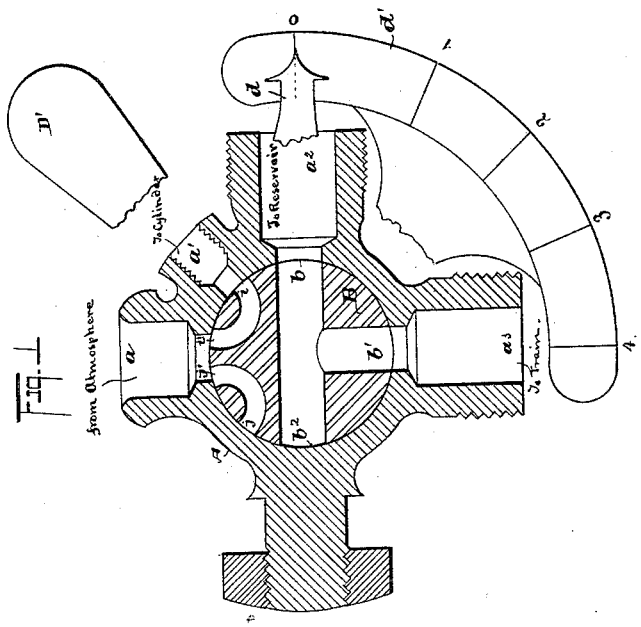
WITNESSES
Belle Lowrie.
Geo. W. King
T. H. Haberkorn INVENTOR
By Liggett & Liggett Attorneys (No Model.) 2 Sheets—Sheet 2.
T. H. HABERKORN.
COMBINATION VALVE FOR OPERATING AIR BRAKE MECHANISM.
No. 398,830. Patented Mar. 5, 1889.
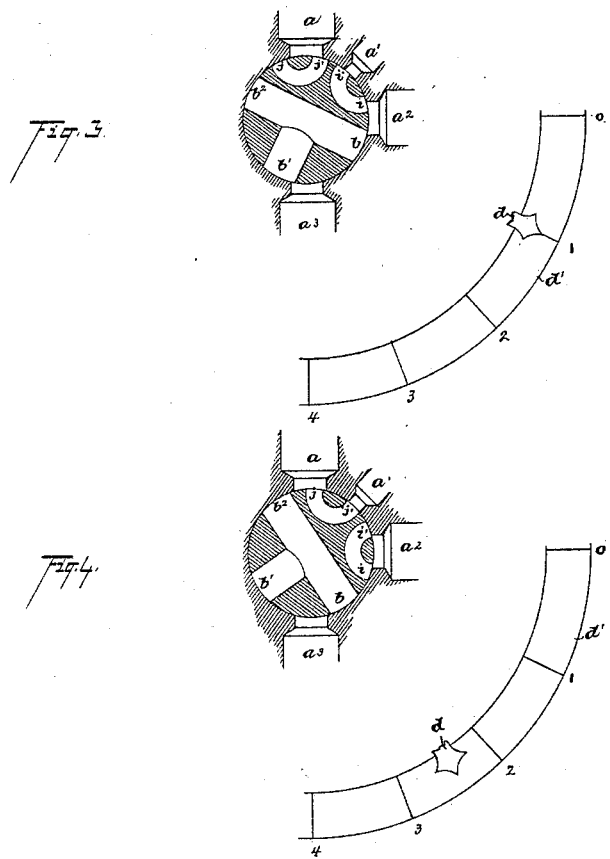
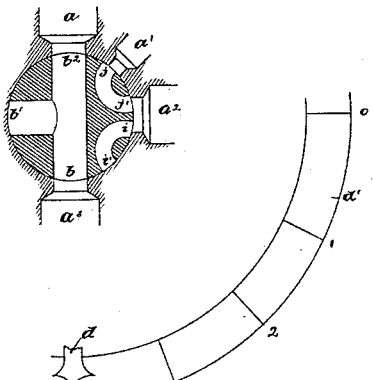
WITNESSES: INVENTOR
BY
ATTORNEYS

UNITED STATES PATENT OFFICE.

THEODORE H. HABERKORN, OF FORT WAYNE, INDIANA.

COMBINATION-VALVE FOR OPERATING AIR-BRAKE MECHANISMS.

SPECIFICATION forming part of Letters Patent No. 398,830, dated March 5, 1889.

Application filed June 21, 1888. Serial No. 277,738. (No model.)

*To all whom it may concern:*

Be it known that I, THEODORE H. HABERKORN, of Fort Wayne, in the county of Allen and State of Indiana, have invented certain new and useful Improvements in Combination-Valves for Operating Air-Brake Mechanisms; and I do hereby declare the following to be a full, clear, and exact description of the invention, such as will enable others skilled in the art to which it pertains to make and use the same.

My invention relates to combination-valves for operating the air-brake mechanism, respectively, of the engine and tender and of the train, the arrangement being such that the mechanism of the engine and tender may be operated separately or may be operated in connection with the mechanism of the brake mechanism of the train.

In the accompanying drawings, Figure 1 is a plan in section. Fig. 2 is an elevation in section. Figs. 3, 4, and 5 are diagrammatic views corresponding with Fig. 1, but showing, respectively, the valve in different positions.

A represents the valve-casing, and B a plug-valve operating therein. The casing is secured to the engine-frame, and the valve is provided with a rod, D, on which are mounted levers D' for operating the valve and pointer $d$, together with stationary dial $d'$, by means of which pointer and dial the position of the valve is indicated. The location of these parts is such that lever D' may be conveniently operated while the engineer is at his post.

Casing A has lateral openings or ports as follows: Port $a$ opens into the atmosphere. Ports $a'$ connect with the pipe leading to the cylinder that operates the brake mechanism of the engine and tender. Ports $a^2$ connect with the pipe leading to the main air-reservoir. Ports $a^3$ connect with a train-pipe—that is, a pipe leading along the train and connecting with the brake mechanism of each car—by means of which air-pressure from the main reservoir is applied to the automatic mechanism of the different brakes of the train, whereby these different brakes are held inoperative or "off" during such pressure, and which is known as the "straight and automatic air-brake system." The valve has ports $b, b'$, and $b^2$, connected at the center of the valve and located substantially as shown. The valve has connected ports $i$ and $i'$ and ports $j$ and $j'$, the latter ports being also in open relation with each other.

In the position of the valve shown in Fig. 1, where the pointer is at zero, connection is had through ports $a^2\ a^3$ between the main air-reservoir and the train-pipe; also, the air-cylinder of the engine may exhaust through ports $i\ i'$; hence with the pointer at zero the brakes of the train and of the engine and tender are off. When the valve is turned to the position shown in Fig. 3, with the pointer at mark 1, communication between the main air-reservoir and the train-pipe is not entirely cut off, and consequently the brakes of the train remain off; but with the pointer at 1 connection through ports $i\ i'$ is established between the main reservoir and the brake-cylinder of the engine, causing the brakes of the engine and tender "to be set." By turning the valve still farther until the pointer is between marks 2 and 3, (see Fig. 4,) the air-cylinder of the engine will again exhaust through ports $j\ j'$, and consequently the brakes of the engine and tender are again off. In this position of the valve communication between the train-pipe and main reservoir is cut off; but the air-pressure in the pipe remains, and consequently the brakes of the train remain off. If the pointer is advanced to mark 4, the valve will be in the position shown in Fig. 5, in which the air of the train-pipe will exhaust through ports $a\ a^3$, thus setting the brakes of the train; also communication between the main reservoir and the air-cylinder of the engine is established through ports $j\ j'$, in consequence of which the brakes of the engine and tender are set. To recapitulate: With the pointer at zero, the brakes are all off. With the pointer at mark 1, the brakes of the engine and tender alone are set. With the pointer between marks 2 and 3, the brakes are again all off. With the pointer at mark 4, the brakes of the engine, tender, and train are all on. By reversing the valve to the starting-point, the brakes will again be all off; or, if the valve is only reversed to the position shown in Fig. 3—that is, with pointer at mark 1—the engine and tender brakes will remain set. The engineer has therefore only to manipulate the lever D' to operate the brakes of the engine and tender and of the train at will.

What I claim is—

1. In a valve for air-brake mechanism, the combination, with a valve-casing having ports connected, respectively, with the train-pipe, with the reservoir, and with the brake-cylinder, and a port leading to the outer air, of a valve located in said casing and provided with three main ports for connecting the reservoir and train-pipe and the train-pipe with the outer air, and two smaller ports for connecting the reservoir and engine-cylinder and the engine-cylinder and outer air, substantially as set forth.

2. The combination, with a casing having ports $a, a', a^2$, and $a^3$, of the valve having port $j\,j'$, port $i\,i'$, and port $b, b'$, and $b^2$, and a handle for turning the valve, substantially as set forth.

In testimony whereof I sign this specification, in the presence of two witnesses, this 26th day of March, 1888.

THEODORE H. HABERKORN.

Witnesses:
R. S. ROBERTSON,
N. A. ROBERTSON.